US012619757B1

(12) United States Patent
Noe et al.

(10) Patent No.: US 12,619,757 B1
(45) Date of Patent: May 5, 2026

(54) SECURE CONTROL OF ACCESS TO DATA IN AN ENCRYPTED FILE

(71) Applicant: NORTHROP GRUMMAN SYSTEMS CORPORATION, Falls Church, VA (US)

(72) Inventors: Brian J. Noe, Indian Harbour Beach, FL (US); Francis B. Afinidad, Melbourne, FL (US); Hope Noe, Indian Harbour Beach, FL (US); Steven D. Ratts, Indian Harbour Beach, FL (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 91 days.

(21) Appl. No.: 18/920,206

(22) Filed: Oct. 18, 2024

(51) Int. Cl.
*G06F 21/62* (2013.01)
*H04L 9/08* (2006.01)

(52) U.S. Cl.
CPC ........ *G06F 21/6218* (2013.01); *H04L 9/0819* (2013.01)

(58) Field of Classification Search
CPC ........................... G06F 21/6218; H04L 9/0819
USPC ......................................................... 713/193
See application file for complete search history.

(56) References Cited

U.S. PATENT DOCUMENTS 8,306,230 B2 * 11/2012 Takakusu .............. H04L 9/0891
380/278
8,756,437 B2 * 6/2014 Monk ................... G06F 21/602
713/193

10,735,191 B1 * 8/2020 Khaleghi ................ H04L 9/088
11,463,443 B2 * 10/2022 Albero ............... G06Q 10/0631
2006/0210071 A1 * 9/2006 Chandran ........... H04L 63/0428
380/42
2014/0094159 A1 * 4/2014 Raleigh ................ H04W 24/02
455/418
2014/0108794 A1 * 4/2014 Barton ................ H04L 63/0428
713/165
2017/0134160 A1 5/2017 Onoda (Continued)

OTHER PUBLICATIONS

P. Chinnasamy; HCAC-EHR: hybrid cryptographic access control for secure EHR retrieval in healthcare cloud; Springer:2022; pp. 1-19.*

(Continued)

*Primary Examiner* — Monjur Rahim
(74) *Attorney, Agent, or Firm* — KATTEN MUCHIN ROSENMAN LLP

(57) ABSTRACT

A security client of a mobile computing platform transmits a request for the secret key to a key server. The request includes environmental data characterizing a current state of the environment of the node and establishes a cryptographic heartbeat with the key server. The security client receives a secret key from the key server, stores the secret key in volatile memory and decrypts the encrypted file using the secret key to create a decrypted file in the volatile memory. The security client monitors a time since a last authenticated heartbeat message was received. Responsive to the time exceeding a predetermined timeout window or responsive to receiving a message from the key server indicating that authorization to the decrypted file is revoked or responsive to determining that the node is not in an authorized environment, the security client deletes the secret key from the volatile memory and closes the decrypted file.

20 Claims, 6 Drawing Sheets

(56)  References Cited

U.S. PATENT DOCUMENTS

| 2019/0068363 A1* | 2/2019 | Rudzitis ................. H04L 9/0891 |
|---|---|---|
| 2019/0342312 A1* | 11/2019 | Watkiss .............. H04L 63/1433 |
| 2020/0044833 A1* | 2/2020 | Shpurov ............ G06F 21/6218 |
| 2020/0322145 A1* | 10/2020 | Sheth .................... H04L 9/3247 |
| 2020/0366472 A1* | 11/2020 | Feng ..................... H04L 9/3247 |
| 2021/0142600 A1* | 5/2021 | Tiwari ............... G07C 9/00309 |
| 2021/0306328 A1 | 9/2021 | Hart et al. |
| 2021/0358251 A1* | 11/2021 | Maclean ............... H04L 9/3273 |
| 2022/0014456 A1* | 1/2022 | Bandi ..................... H04L 43/10 |
| 2022/0035933 A1 | 2/2022 | Qiao et al. |
| 2022/0223242 A1 | 7/2022 | Mcfarlane |
| 2022/0253553 A1 | 8/2022 | Indukuri et al. |
| 2023/0281606 A1* | 9/2023 | Jakobsson ................. H04L 9/50 |
| | | 705/67 |
| 2024/0265118 A1 | 8/2024 | Valdez |
| 2025/0310099 A1* | 10/2025 | Berkman ............ G06F 21/6218 |

OTHER PUBLICATIONS

International Search Report and Written Opinion mailed Feb. 6, 2026, from International Application No. PCT/US2025/046772, 13 sheets.

* cited by examiner

SECURE CONTROL OF ACCESS TO DATA IN AN ENCRYPTED FILE

TECHNICAL FIELD

The present disclosure relates to data access. More particularly, this disclosure relates to systems and methods for securely controlling access to sensitive data in an encrypted file.

BACKGROUND

The widespread adoption of portable electronic devices has revolutionized how individuals and organizations access and manage sensitive information. These devices, including laptops, tablets and smartphones, offer flexibility and productivity in various environments, from corporate offices to remote field locations. As the capabilities of these devices have expanded, so too has the use of such portable electronic devices in handling increasingly sensitive and classified data.

Concurrently, the field of cryptography has advanced significantly, providing robust methods for securing digital information. Modern encryption techniques allow for the protection of data both at rest and in transit, ensuring that sensitive information remains confidential even if a device is lost or stolen. These advancements have enabled the development of sophisticated key management systems that can dynamically control access to encrypted data.

SUMMARY

A first example relates to a system for controlling access to data that includes a node with an environmental sensor that measures a feature of the environment, a non-transitory non-volatile memory storing machine-readable instructions and an encrypted file only decryptable with a secret key. The system also includes a non-transitory volatile memory storing machine-readable instructions and a processor for accessing the instructions. The machine-readable instructions include operations for a security client executable by the processor. The operations for the security client include transmitting a request for the secret key to a key server with environmental data characterizing the current environment state, establishing a cryptographic heartbeat with the key server and receiving and storing the secret key in volatile memory. The operations for the security client also include decrypting the encrypted file to create a decrypted file in volatile memory, monitoring a time since a last authenticated heartbeat message was received from the key server and deleting the secret key and closing the decrypted file responsive to the time exceeding a timeout window, in response authorization being revoked or in response to determining that the node is not in an authorized environment based on the environmental data. The security client prevents storage of the secret key and decrypted file in non-volatile memory.

A second example relates to a non-transitory machine-readable medium storing instructions that, when executed by a processor of a mobile computing platform, cause the processor to execute operations for a security client. The operations include collecting environmental data from an environmental sensor of the mobile computing platform and transmitting the environmental data to a key server for authentication. The operations also include receiving a secret key from the key server, decrypting an encrypted file stored in a non-transitory non-volatile memory of the mobile computing platform using the secret key to create a decrypted file in a non-transitory volatile memory of the mobile computing platform. The operations further include monitoring a time since a last authenticated heartbeat message was received from the key server and monitoring for receipt of an authorization revocation message from the key server or generation of the authorization revocation message based on the environmental data. The operations include in response to the time exceeding a predetermined timeout window or receiving or generating the authorization revocation message, removing the secret key from the non-transitory volatile memory and closing the decrypted file.

A third example relates to a method for secure data management. The method includes collecting, by a mobile computing platform, environmental data from an environmental sensor associated with the mobile computing platform. The method includes transmitting, by the mobile computing platform, the environmental data to a key server for authentication and receiving, by the mobile computing platform, a secret key from the key server. The method includes decrypting, by the mobile computing platform, an encrypted file stored in a non-transitory non-volatile memory of the mobile computing platform using the secret key to create a decrypted file in a non-transitory volatile memory of the mobile computing platform. The method includes monitoring, by the mobile computing platform, a time since a last authenticated heartbeat message was received from the key server and periodically collecting and transmitting, by the mobile computing platform, updated environmental data to the key server for continued authentication. The method further includes in response to the time exceeding a predetermined timeout window, receiving an authorization revocation message from the key server based on the updated environmental data or generating the authorization revocation message based on the updated environmental data indicating that the mobile computing platform is not in an authorized environment, removing, by the mobile computing platform, the secret key from the non-transitory volatile memory and closing the decrypted file. The mobile computing platform prevents the secret key and the decrypted file from being stored in the non-transitory non-volatile memory of the mobile computing platform.

DETAILED DESCRIPTION

This description relates to an ODKMS (On-Demand Key Management System) designed to secure data on portable devices such as laptops, tablets and virtual 3D glasses in certain environments, such as proprietary and/or restricted environments. The ODKMS employs a combination of file encryption, environmental authentication, timed access control and user authentication to manage access to encrypted data (e.g., sensitive data) stored on the portable device. The ODKMS encrypts files to form the encrypted data using keys associated with various classification levels or data restrictions, and only allows decryption when specific conditions are met. These conditions include user authentication, device connectivity to an approved network, presence in an allowable environment and operation within a defined time window.

The ODKMS utilizes a secure cryptographic heartbeat mechanism to maintain a connection between a key server that stores the keys and the portable device, ensuring continuous verification of an authorized status for the portable device. If the heartbeat is interrupted and/or if the portable device leaves the authenticated environment, a client on the portable device automatically removes decryption keys from a volatile memory and of the portable device closes decrypted files, which are also only present in the volatile memory of the portable device.

Figure 1:
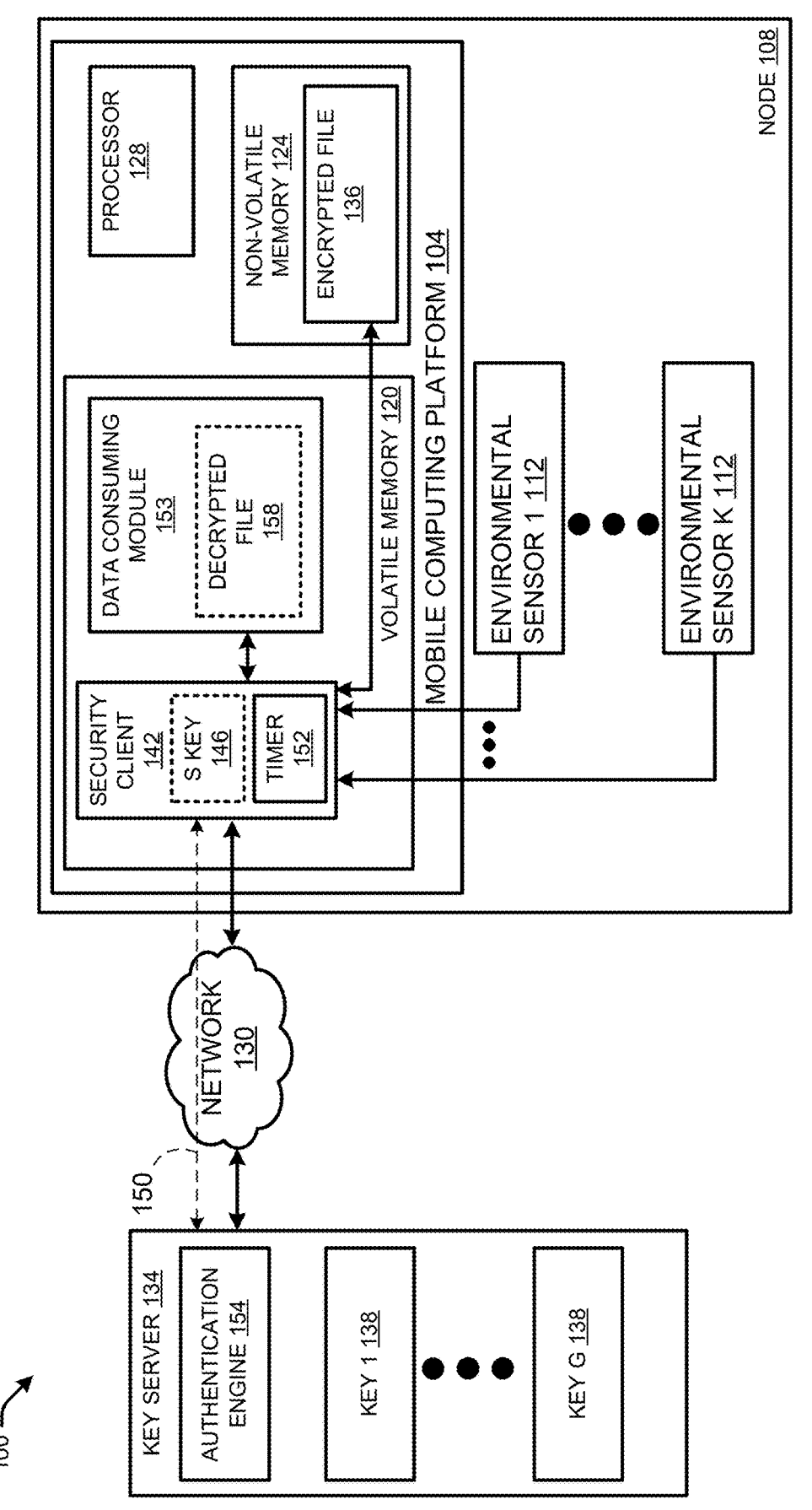
FIG. 1 illustrates an example of an ODKMS (On-Demand Key Management System) to securely control access to data embedded in an encrypted file.

The ODKMS addresses security challenges in using commercial off-the-shelf (COTS) devices in classified settings to securely manage sensitive data without requiring special handling procedures or limiting a functionality of the portable device. The ODKMS also incorporates measures to compromising the keys managed by the key server. In particular, the keys and decrypted files are stored exclusively in the volatile memory of the and implementing non-persistence controls. The ODKMS enables the secure use of portable devices in classified or restricted environments while maintaining data security and providing an automated mechanism to remove sensitive data if the device leaves an approved area FIG. 1 illustrates an example of an ODKMS 100 (On-Demand Key Management System) that enables a secure connection for portable devices to a network, enabling the decryption of files based on user authentication, environmental verification and timed access control. As used herein, the term "file" could correspond to a single digital file or multiple digital files. Additionally, the file can be nearly any consumable file format, including a data file, an executable file, a text file, etc.

The ODKMS 100 can include a mobile computing platform 104 that can be part of a node 108. The mobile computing platform 104 can be implemented as a computing device, such as a single board computer. In some examples, such as the example illustrated in FIG. 1, the mobile computing platform 104 can be physically integrated with the node 108. In other examples, the mobile computing platform 104 can be external to the node 108, including situations where the mobile computing platform 104 is mounted on an exterior of the node 108 or in situations where the mobile computing platform 104 is spaced apart from the node 108 and the mobile computing platform 104 communicates with the node 108 through wireless communications. As some examples, the node 108 can be implemented as a hardware device for deployment in a particular environment.

The node 108 includes K number of environmental sensors 112, where K is a positive integer. Each environmental sensor 112 is employable to sense characteristics of an environment in which the node 108 is located. Thus, the K number of environmental sensors can provide data (e.g., environmental data) characterizing a current state of an environment of the node 108. The environmental sensors 112 can include, but are not limited to navigational sensors, such as a GNSS (global navigation satellite system), an accelerometer, a temperature sensor or any other sensor that can be configured to accurately sense a current environment of the node 108. In examples where the environmental sensors 112 include a GNSS, the GNSS can be implemented with a GPS (Global Positioning System), GLONASS, BeiDou or Galileo, depending on an earthly position of the node 108.

The mobile computing platform 104 can be a portable device, such as a laptop computer, a tablet computer, a smartphone, etc. The mobile computing platform 104 includes a volatile memory 120 and a non-volatile memory 124. The volatile memory 120 and the non-volatile memory 124 are both non-transitory machine-readable media that store machine-readable instructions and data. However, the volatile memory 120 (a non-transitory medium) is erased when power to the mobile computing platform 104 is disabled or when the volatile memory 120 is intentionally cleared. The volatile memory 120 can be implemented, for example, as RAM (random access memory), such as DRAM (Dynamic RAM) or SRAM (static RAM). The non-volatile memory 124 (a non-transitory medium) can be implemented, for example, as flash memory, an HDD (hard disk driver), an SSD (solid-state drive), etc. The mobile computing platform 104 includes a processor 128 (formed of a processor core or multiple processor cores) that executes machine-readable instructions and data stored in the volatile memory 120 and the non-volatile memory 124.

The mobile computing platform is coupled to a network 130. The network 130 could represent, for example, a public network (e.g., the Internet), a private network (e.g., a cellular network) or a combination thereof (e.g., a virtual private network). The connection to the network 130 could be a wireless connection or a wired connection.

A key server 134 also communicates on the network 130. The key server 134 is a computing platform that includes a processor and memory, which are omitted for simplicity. The key server 134 could be implemented in a computing cloud. In such a situation, features of the key server 134, such as the processor, a network interface and the memory could be representative of a single instance of hardware or multiple instances of hardware with applications executing across the multiple of instances (i.e., distributed) of hardware (e.g., computers, routers, memory, processors, or a combination thereof). Alternatively, the key server 134 could be implemented on a single dedicated server.

The key server 134 securely stores G number of keys 138. In some examples, each of the G number of keys 138 can be a symmetric key that is configured to decrypt and encrypt data, where G is a positive integer. In other examples, each of the G number of keys 138 represents a pair of asymmetric keys (e.g. a public and private key pair set). Each of the G number of keys 138 can be associated with a particular security level. Accordingly, in some examples, each of the G number of keys 138 are employable to decrypt files with a particular security level (e.g., secret, top secret, etc.).

The mobile computing platform 104 can store an encrypted file 136 in the non-volatile memory 124. In some examples, the encrypted file 136 can represent multiple encrypted files and/or a folder/directory of encrypted files. In any such example, the encrypted file 136 includes encrypted data that can only be decrypted with a particular secret key 146 (labeled as "S KEY" in FIG. 1). Stated differently, encrypted data stored in the encrypted file 136 is inaccessible (e.g., unintelligible) without decryption. In some examples, the secret key 146 (or a copy of the secret key 146) could have been employed to encrypt the encrypted file 136. In other examples, a complement of the secret key 146 (e.g., an asymmetric key of an asymmetric key pair) can be employed to encrypt the encrypted file 136 and the secret key 146 is employable to decrypt the encrypted file 136. In any such situation, without access to the secret key 146, data embedded in the encrypted file 136 is unintelligible.

The volatile memory 120 includes a security client 142. The security client 142, as illustrated is being executed on the mobile computing platform 104. The security client 142 is configured to establish a secure communication channel 150 with an authentication engine 154 executing on the key server 134. The security client 142 initiates the request for the secret key 146 by transmitting an authorization and key request for the secret key 146 to the key server 134 through the established secure communication channel 150. The authentication engine 154 employs the secure communication channel 150 to authenticate the mobile computing platform 104. The authentication process is based on factors, such as user credentials and environmental data. The security client 142 transmits these authentication factors to the authentication engine 154 (e.g., as part of the authorization and key request for the secret key 146). The environmental data includes information gathered from the environmental sensors 112. In some examples, such as the situations where one of the environmental sensors is a GNSS sensor, a portion of environmental data can be implemented as location information (latitude and longitude coordinates) for the node 108. In such a situation, the authentication engine 154 analyzes the location data to ensure that the node 108 is within an authorized geographical area to determine if the mobile computing platform 104 is authorized to receive the secret key 146. The authorization can include, for example, analyzing a security level of the user credentials, and selecting the key of the G number of keys 138 associated with the security level.

Responsive to a successful verification of both the user credentials and the environmental data, the authentication engine 154 authorizes the release of the secret key 146 (e.g., one of the G number of keys 138) and the authentication engine 154 initiates a cryptographic heartbeat process with the mobile computing platform 104 through the secure communication channel 150. To initiate the cryptographic heartbeat process, with the mobile computing platform 104 through the secure communication channel 150, the authentication engine 154 securely transmits a heartbeat initiation message to the security client 142. The heartbeat initiation message includes data for establishing a timeout window and an authorization window. The timeout window defines an amount of time that the security client 142 can access the secure key 146 since a last heartbeat message is received from the authentication engine 154 of the key server 134. The authorization window defines a total time that the security client 142 can access the secure key 146. The security client 142 initiates a timer 152 to monitor whether the timeout window or the authorization window has been exceeded.

In response to the heartbeat initiation message, the security client 142 analyzes environmental data from the K number of environmental sensors 112 characterizing a current state of the environment of the node 108 to determine whether the node 108 is in an authorized environment. Additionally, in response to the heartbeat initiation message (a cryptographic heartbeat message), the security client 142 provides a heartbeat message (a cryptographic heartbeat message) to the authentication engine 154 that includes the environmental data characterizing the current state of the environment of the node 108. In response, the authentication engine 154 analyzes the heartbeat message to ensure that the environmental data indicates that the security client 142 is still authorized to access the secret key 146 and provides a heartbeat response (a cryptographic heartbeat message) that includes a copy of the secret key 146 (one of the G number of keys 138). In some examples, if the security client 142 determines that the node 108 is not in the authorized environment, the security client 142 does not respond to the heartbeat initiation message, preventing the security client 142 from receiving the secret key 146. Accordingly, in some examples, both the security client 142 and the authentication engine 154 analyze the environmental data to ensure that the node 108 is in the authorized environment. Additionally, the transmission of the secret key 146 occurs after the cryptographic heartbeat message is received from the security client 142, ensuring that the secret key 146 is provided after the secure heartbeat mechanism is in place.

In response to the heartbeat response (a cryptographic heartbeat message), the security client 142 stores the received secret key 146 in the volatile memory 120 of the mobile computing platform 104. The cryptographic heartbeat process then continues at regular intervals, with the authentication engine 154 and the security client 142 exchanging heartbeat messages through the secure communication channel 150. These subsequent heartbeat messages from the security client 142 include updated environmental data from the environmental sensors 112, allowing for continuous verification of the authorization status of the security client 142. Additionally, in some examples, the security client 142 analyzes the updated environmental data from the environmental sensors 112 prior to sending such subsequent heartbeat messages to ensure that the node 108 is still in the authorized environment.

The security client 142 employs the secret key 146 to decrypt the encrypted file 136 stored in the non-volatile memory 124, creating a decrypted file 158 in the volatile memory 120. The cryptographic heartbeat process continues at regular intervals, with the key server 134 and the mobile computing platform 104 exchanging heartbeat messages through the secure communication channel 150. The heartbeat messages provided from the mobile computing platform 104 are based on an internal clock of the mobile computing platform 104 and include an updated version of environmental data from the K number of environmental sensors 112. In some examples, the node 108 includes an atomic clock (or other device) to synchronize the internal clock of the mobile computing platform 104 and to prevent tampering with the heartbeat message provided from the security client 142 to the authentication engine 154. These subsequent heartbeat messages serve to verify the continued authorization of the mobile computing platform 104 and reset the timer 152 on the security client 142 for the timeout window. Stated differently, each heartbeat response from the authentication engine 154 causes the security client 142 to reset the timer 152 for the timeout window. Accordingly, the security client 142 is configured to monitor a time since a last heartbeat message is received from the authentication engine 154 to ensure that a timeout is not detected.

If the timer 152 indicates that the timeout window has been exceeded, indicating that a least heartbeat message (e.g., a heartbeat response) was received at the security client 142 at a time interval that exceeded the timeout window, or if the timer 152 (e.g., a second, not resetting timer) exceeds the authorization window, such that the authorization window expires, or the security client 142 generate or receives an authorization revocation message, the security client 142 takes immediate action. In particular, if either the timeout window or the authorization window has expired (e.g., the timer 152 indicates that the time since the initial heartbeat message was received by the security client exceeds the authorization window), or the security client 142 generates or receives an authorization revocation message the security client 142 automatically removes (e.g., deletes) the secret key 146 from the volatile memory 120 and closes the decrypted file 158, effectively terminating access to the sensitive information embedded in the decrypted file 158. In some examples, the closing of the decrypted file 158 can include re-encrypting the file to provide an updated version of the encrypted file 136. In other examples, the closing of the decrypted file 158 can include deleting the decrypted file 158 from the volatile memory 120. Additionally, in some examples, the security client 142 overwrites the portion of the volatile memory 120 that was occupied by the decrypted file 158 and the secret key 146 with random data to further improve security.

The timeout window could be exceeded for a variety of reasons. For instance, if the mobile computing platform 104 is in transit and loses communication with the network 130 for an interval of time greater than the timeout window, the timeout window would be exceeded. Alternatively, if the network communications on the mobile computing platform 104 are disabled (e.g., due to a potential security breach), the timeout window could also be exceeded.

In some examples, the authorization revocation message could be generated by the security client 142 if the current environmental data form the K number of environmental sensors 112 indicates that the node 108 is not in the authorized environment (e.g., the environmental data indicates the node 108 is outside acceptable limits). That is, the security client 142 monitors the environmental data, and makes a self-determination as to whether the security client 142 should have authorization to access the secret key 146 and the decrypted file 158. Additionally or alternatively, the revocation message can be generated by the authentication engine 154 and received at the security client 142. In such a situation, the authentication engine 154 can analyze the (current) environmental data included with a heartbeat message to determine whether the security client 142 is still in the authorized environment. In response to determining that the node 108 is not in the authorized environment, the authentication engine 154 can generate the authorization revocation message and transmit the authorization revocation message to the security client 142. Thus, in some examples, both the authentication engine 154 and the security client 142 monitor the environmental data to determine whether the node 108 is still authorized to access the secret key 146 and the decrypted file 158.

Inclusion of the self-monitoring of the environmental data (e.g., local monitoring) by the security client 142 can cause the security client 142 to revoke access to the secret key 146 and the decrypted file 158 prior to the timeout window where the secure communication channel 150 has been severed. For instance, if the environmental data from the K number of environmental sensors 112 is location data, and the location data indicates that the node 108 is not within a geofence coordinates (e.g., defined in the heartbeat initiation message or through a different mechanism), the security client 142 can self-revoke access to the secret key 146 and the decrypted file 158 even if there is no communication to the key server 134. Similarly, suppose that the environmental data includes an acceleration of the node 108, such as a situation where the authorized environment is stationary (e.g., a vault). In this situation, if the acceleration of the node

108 increases, the security client 142 can determine that the node 108 is being moved (e.g., operated in an unauthorized environment) and the security client 142 can self-revoke access to the secret key 146 and the decrypted file 158.

The mobile computing platform 104 also includes a data consuming module 153, residing in the volatile memory 120. The data consuming module 153 is to access, process and/or manipulate decrypted data in the decrypted file 158. The data consuming module 153 can implement a software application (e.g., an App) for displaying an/or manipulating the decrypted data in the decrypted file 158. However, the access to the decrypted file 158 is strictly controlled and is only permitted under two conditions: first, the secret key 146 must be available in the volatile memory 120 and second, the timer 152 must not have exceeded the predetermined timeout window or the authorization window (e.g., the authorization window has not expired). These conditions ensure that the sensitive data stored in the encrypted file 136 is only accessible when the mobile computing platform 104 is in an authenticated state and within the approved time frame.

In situations where the data consuming module 153 modifies the data (e.g., content) of the decrypted file 158, when the security client 142 closes the decrypted file, the security client 142 can re-encrypt the decrypted file 158 with the changed data using the secret key 146, to provide a re-encrypted file. The re-encrypted file can be stored in the non-volatile memory 124 to replace or augment the encrypted file 136 (e.g., as a new version of the encrypted file 136). Additionally, the security client 142 is configured to prevent the data in the decrypted file 158 and the secret key 146 from being stored in the non-volatile memory 124. Thus, the security client 142 is configured to monitor operations of the 104 that to prevent copying/moving the secret key 146 and data in the decrypted file 158 into the non-volatile memory 124. The security client 142 is configured such that the secret key 146 and the decrypted file 158 are only ever stored on the volatile memory 120.

In some examples, the authorization for the secret key 146 can be transferred from the key server 134 (e.g., a first key server) to another key server (not shown). For instance, if the node 108 is in motion, after the security client 142 receives a given heartbeat from the authentication engine 154 of the key server 134, the mobile computing platform 104 can switch wireless access points to securely communicate with the other key server, and the key server 134 can transfer the authorization for the secret key 146 to the other key server. From the perspective of an end-user of the mobile computing platform 104, the data consuming module 153 can continue uninterrupted access to the decrypted file 158, and the next heartbeat is provided from the other key server 134.

The ODKMS 100 enhances security by strictly adhering limiting the use of decrypted, sensitive data to the volatile memory 120 of the mobile computing platform 104. The ODKMS 100 is designed to ensure that under no circumstances are the secret key 146 and/or the decrypted file 158 stored in the non-volatile memory 124 of the mobile computing platform 104. This feature maintains the security of the sensitive data embedded in the encrypted file 136. Even in scenarios where the mobile computing platform 104 is physically compromised or inadvertently leaves the authenticated environment, the sensitive information remains protected. The absence of any trace of the secret key 146 or decrypted file 158 in non-volatile memory 124 curtails a risk of unauthorized access or data breaches.

The ODKMS 100 also implements a secure cryptographic heartbeat mechanism to maintain continuous verification of the authorization status of the mobile computing platform 104. This heartbeat is a periodic, encrypted message exchanged between the security client 142 and the key server 134. The heartbeat serves multiple purposes, namely, the heartbeat confirms that the mobile computing platform 104 remains within the authenticated environment, verifies the integrity of the secure communication channel 150 and resets the timer 152 for the timeout window. The security client 142 is configured to monitor the timer 152 such that if the heartbeat fails or is interrupted, the timer 152 triggers the automatic security measures, including the removal of the secret key 146 and closure of the decrypted file 158.

To further enhance security, the ODKMS 100 incorporates a sliding time window for access control, namely the timeout window. This feature allows for a dynamic period of validity for the decrypted files. The ODKMS 100 can extend the end of the period of validity if the heartbeat messages are consistently received, allowing for continuous operation in authenticated environments. However, if the heartbeat is lost (e.g., no heartbeat message is received by the security client 152) with a time interval defined by the timeout window, the security client of the ODKMS 100 will remove the keys and erase any plaintext data, ensuring that sensitive information is not retained beyond its authorized period.

FIGS. 2A-2D illustrate process diagrams for an ODKMS 200 that could include the components of the ODKMS 100. For purposes of simplification, some elements of the ODKMS 200 have been omitted. The ODKMS 200 includes a node 204 that could be employed to implement the node 108 of FIG. 1. The node 204 includes a mobile computing platform 208 that could be employed to implement the mobile computing platform 104 of FIG. 1. The node 204 includes K number of environmental sensors (not shown), such as the K number of environmental sensors 112 of FIG. 1.

The mobile computing platform 208 can store an encrypted file (e.g., the encrypted file 136 of FIG. 1) in non-volatile memory (a non-transitory medium). The encrypted file can only be decrypted with a secret key (e.g., the secret key 146 of FIG. 1). Additionally, the mobile computing platform 208 can execute a security client (e.g., the security client 142 of FIG. 1), such that the security client is stored in volatile memory (a non-transitory medium). The security client of the mobile computing platform 208 is employable to decrypt the encrypted file using the secret key. However, the security client is configured such that the security key can only be stored in the volatile memory of the mobile computing platform 208.

The ODKMS 200 includes a first WAP 212 (wireless access point) and a second WAP 216. The first WAP 212 and the second WAP 216 are connected to a network (e.g., the network 130 of FIG. 1). The first WAP 212 and the second WAP 216 are located in different locations. In some examples, the first WAP 212 facilitates communication between the mobile computing platform 208 and a first key server 220 (e.g., a first instance of the key server 134 of FIG. 1), and the second WAP 216 facilitates communication between the mobile computing platform 208 and a second key server 224 (e.g., a second instance of the key server 134).

Figure 2A:
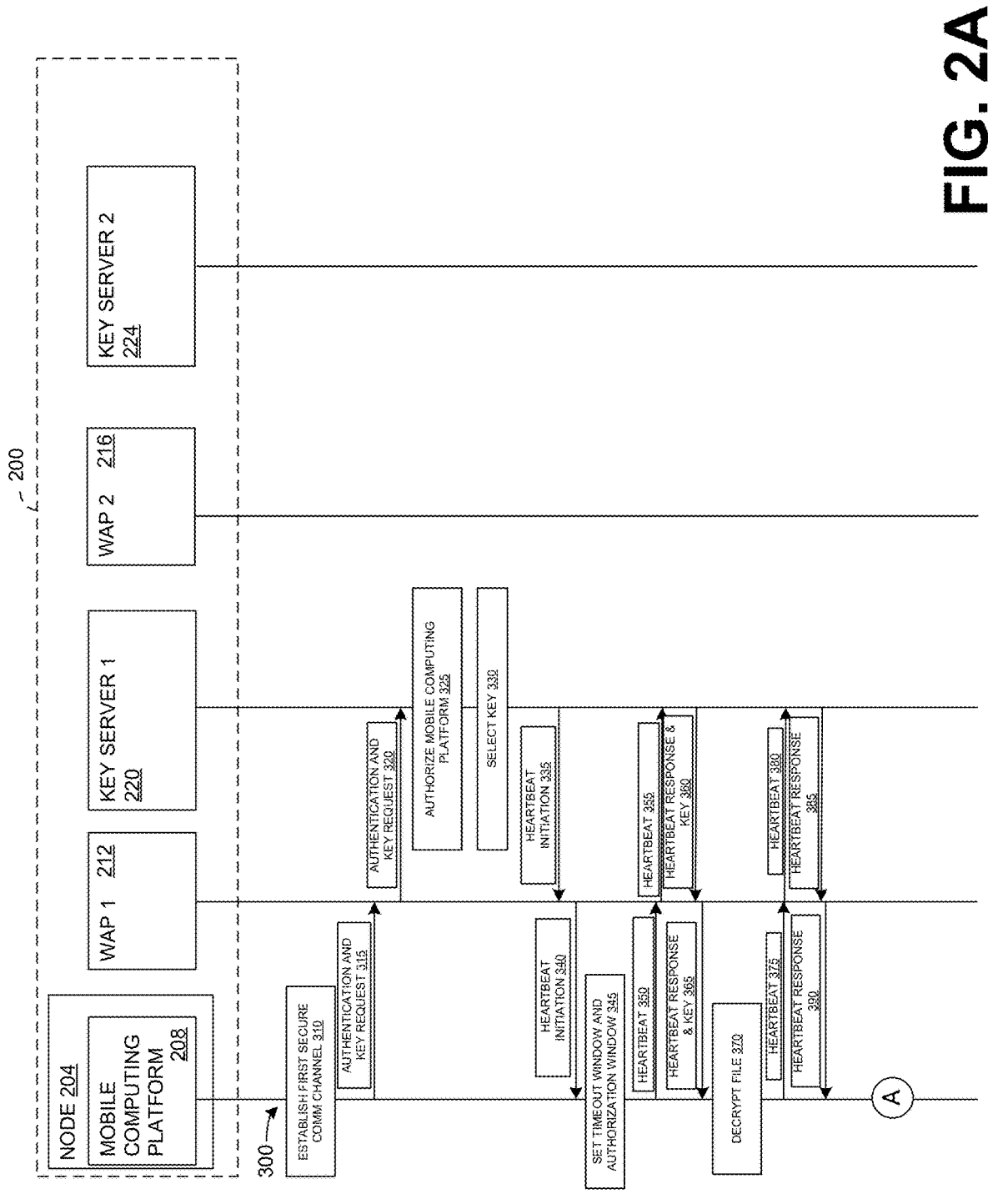
FIG. 2A illustrates a process diagram of a ODKMS executing a method to enable access to data embedded in an encrypted file.

In FIG. 2A, the ODKMS 200 executes a method 300 for securely providing access to data encrypted in the encrypted file. At operation 310, the mobile computing platform 208 establishes a secure communication channel over the network with the first key server 220. The secure communication channel can be established through the first WAP 212.

At operation 315, the mobile computing platform 208 sends an authentication and key request to the first key server 220 through the secure communication channel. This authentication and key request includes user credentials and environmental authentication data collected from the environmental sensors of the node 204.

At operation 320, the first key server 220 processes the authentication and key request. During this operation, the first key server 220 verifies the user credentials and analyzes the environmental authentication data to ensure the mobile computing platform 208 is within an authorized area and meets the required environmental parameters. At operation 325, in response to the authentication being successful, the first key server 220 authorizes the mobile computing platform 208 to receive the requested key. The authorization process includes analyzing the security level of the user credentials and selecting the appropriate key from the key compartments stored on the first key server 220. At operation 330, the first key server 220 then selects the appropriate key from G number of keys (e.g., the G number of keys 138 of FIG. 1) based on the determined authorization level.

At operation 335, the first key server 220 initiates the cryptographic heartbeat mechanism. The first key server 220 sends the instructions to initiate the cryptographic heartbeat to the mobile computing platform 208. At operation 340, the mobile computing platform 208 receives heartbeat initiation instructions. In response to the heartbeat initiation instructions, at operation 345, the mobile computing platform 208 sets a timeout window and authorization window based on the instructions received from the first key server 220. The timeout window defines the time interval during which the mobile computing platform 208 can maintain the key and access decrypted files between received heartbeat messages. The authorization window defines a total time interval that the mobile computing platform 208 can maintain the key and access decrypted files. The authorization window expires when the time that the security client 142 receives the initial heartbeat message and a current time exceeds the authorization window.

The secure cryptographic heartbeat process begins at operation 350, with the mobile computing platform 208 sending a heartbeat message destined for the first key server 220 to the first WAP 212. At operation 355, the first WAP 212 forwards the heartbeat message to the first key server 220. At operation 360, the first key server 220 responds to the heartbeat, confirming the continued authorization of the mobile computing platform 208, and the response includes the secure key destined for the mobile computing platform 208 to the first WAP 212. At operation 365, the mobile computing platform 208 receives the heartbeat response and the secure key.

At operation 370, with the key now securely stored in the volatile memory of the mobile computing platform 208, the mobile computing platform 208 decrypts the encrypted file. The heartbeat process continues at regular intervals. Thus, at operation 375, the mobile computing platform 208 sends a next heartbeat message destined for the first key server 220 to the first WAP 212. At operation 380, the first key server 220 receives the next heartbeat message. At operation 385, the first key server 220 transmits the heartbeat response destined for the mobile computing platform 208 to the first WAP 212. At operation 390, the heartbeat response is received at the mobile computing platform 208 from the first WAP 212, confirming continued authorization to access the decrypted file. This heartbeat process continues as long as the mobile computing platform 208 remains within the authorized environment, the timeout window has not been exceeded, and the authorization window has not expired. If the heartbeat fails or the mobile computing platform 208 leaves the authorized environment, the key will be automatically deleted from the volatile memory and any decrypted files will be securely closed, ensuring the continued security of the sensitive data. FIG. 2A includes a node A indicating a point for operations described in FIGS. 2B-2D.

Figure 2B:
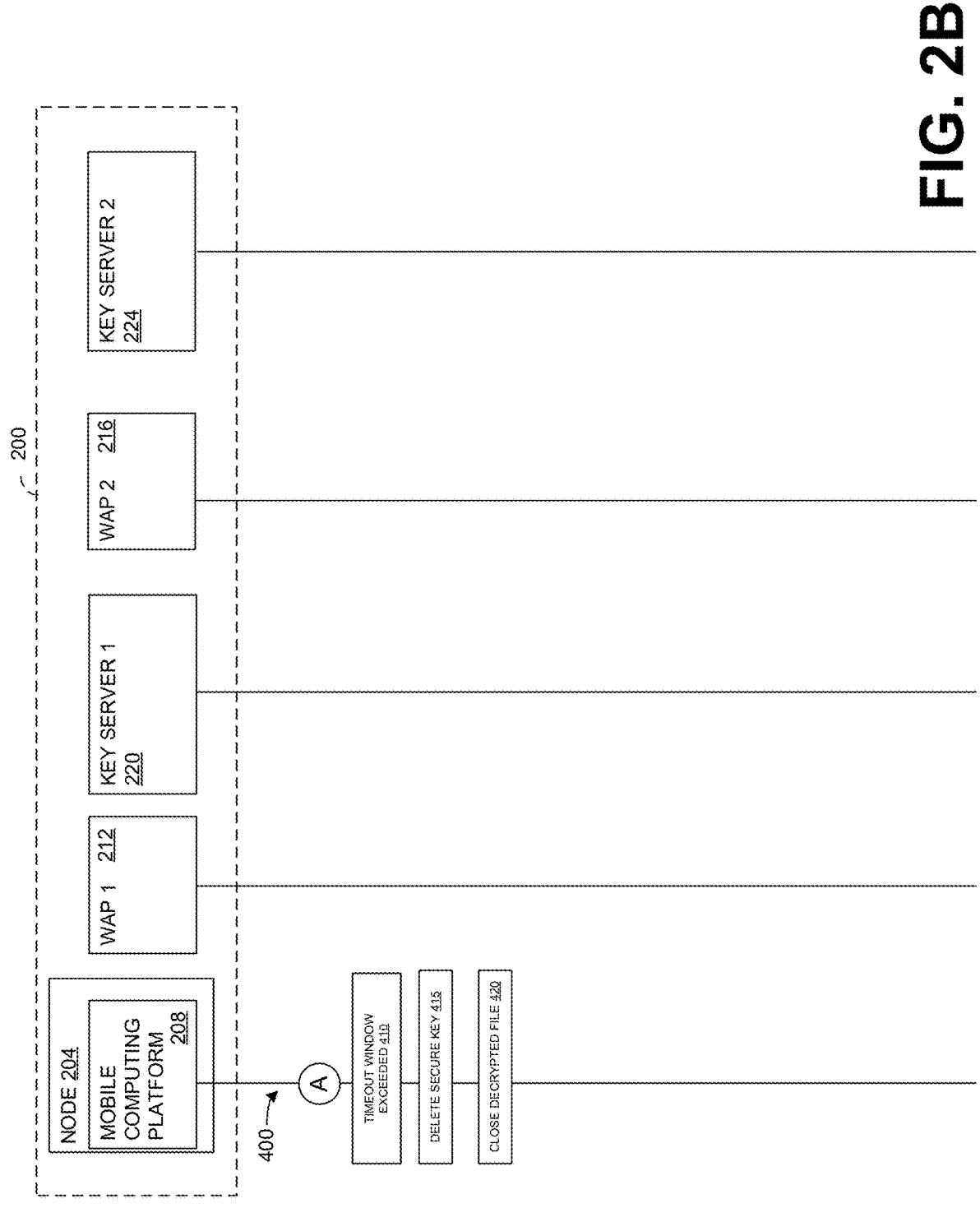
FIG. 2B illustrates a method of the ODKMS of FIG. 2A exceeding a timeout window and revoking access the data embedded in the encrypted file.

More specifically, FIG. 2B illustrates a method 400 where a timeout is detected. The method 400 continues from node A of FIG. 2B, such that the heartbeat is established, and the mobile computing platform 208 is actively accessing the encrypted file.

At operation 410, the ODKMS 200 detects that the timeout window has been exceeded. As noted, this timeout window is a predetermined time interval during which the mobile computing platform 208 must receive a heartbeat message from the key server to maintain an authorized status. In response to the timeout window being exceeded, the ODKMS 200 initiates the secure deletion process at operation 415. During the operation 415, the mobile computing platform 208 automatically deletes (removes) the secure key from the volatile memory of the mobile computing platform 208. Deletion of the secure key ensures that the secure key is no longer available for decryption purposes.

Additionally, at operation 420, the mobile computing platform 204 closes the decrypted file. This closure of the decrypted file involves removing decrypted data from the volatile memory of the mobile computing platform 208. The mobile computing platform 208 may be configured to also overwrite the memory space previously occupied by the decrypted file and/or the secure key with random data to prevent a potential data recovery attempt. Removal of the secure key (at operation 315) and the decrypted file effectively revokes access to the encrypted data.

The operations 410, 415 and 420 are executed on the mobile computing platform 208, and do not requiring communication with another node on the ODKMS 200, such as the first WAP 212 or the first key server 220. This local execution ensures that the secure deletion process can be completed even if network connectivity is lost or compromised. The method 400 demonstrates an ability of the ODKMS 200 to maintain security even when communication with the key server is interrupted. By automatically deleting the secure key and closing the decrypted file upon the timeout, the ODKMS 200 prevents unauthorized access to sensitive data, maintaining the integrity and confidentiality of the information stored on the mobile computing platform 208.

Figure 2C:
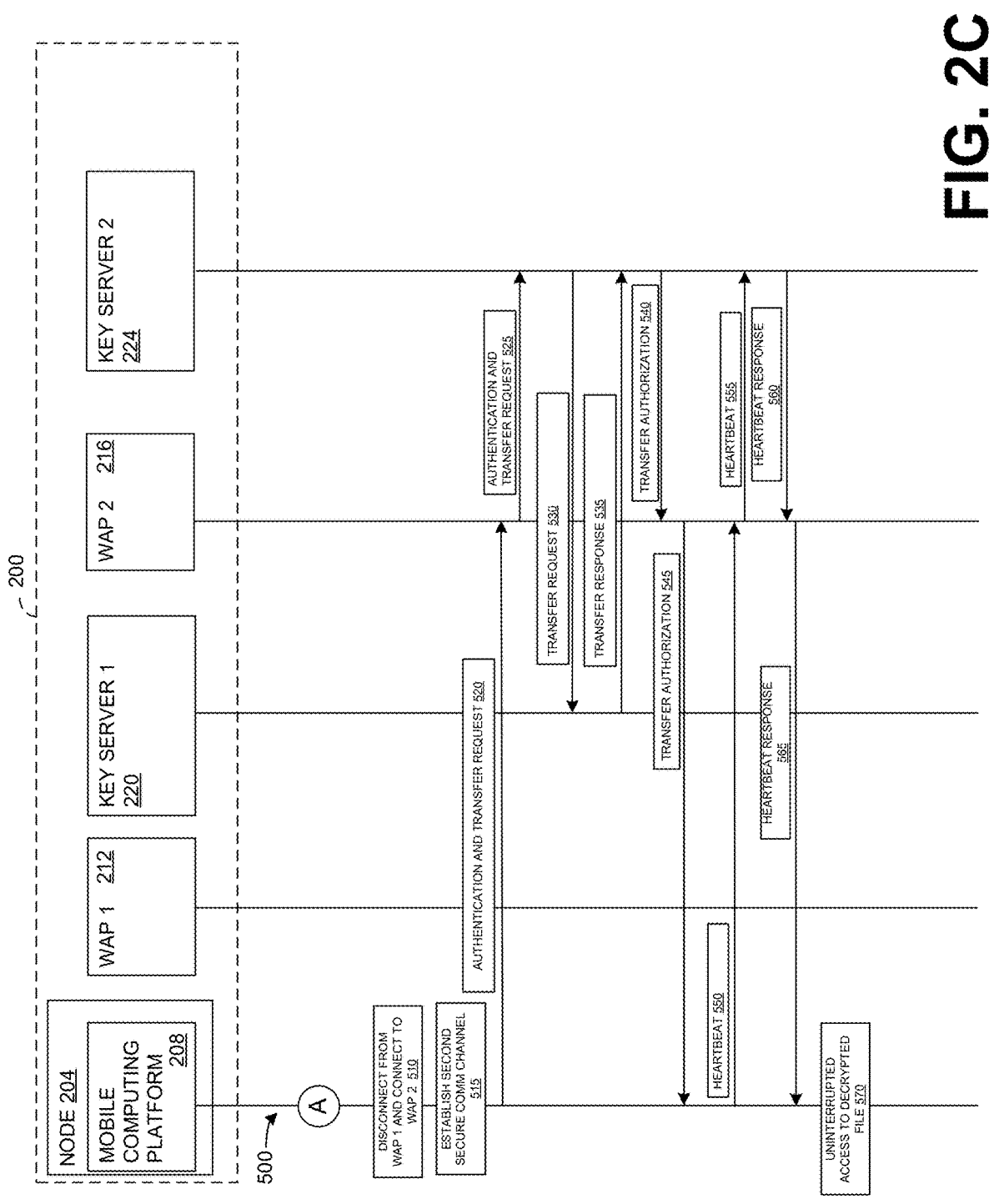
FIG. 2C illustrates a method of the ODKMS of FIG. 2A where a mobile computing platform requests a transfer of authorization for a secure key from first key server to a second key server.

FIG. 2C illustrates a method 500 where the mobile computing platform 208 requests a transfer of authorization for the secure key from the first key server 220 to the second key server 224. The method 400 continues from node A of FIG. 2B, such that the heartbeat is established with the first key server 220, and the mobile computing platform 208 is actively accessing the encrypted file.

At operation 510, the mobile computing platform 208 disconnects from the first WAP 212 and connects to the second WAP 216. This operation may occur, for example, when the mobile computing platform 208 moves to a new location or detects a stronger signal from the second WAP 216. At operation 515, the mobile computing platform 208 establishes a second secure communication channel with the second key server 224 through the second WAP 216, and the first secure communication channel between the mobile computing platform 208 and the first key server 220 is disconnected.

At operation 520, the mobile computing platform 208 sends an authentication and transfer request to the second key server 224 through the second WAP 216 using the newly established secure communication channel. This authentication and transfer request includes the necessary user credentials and environmental authentication data collected from the environmental sensors on the node 204. At operation 525, the second key server 224 receives the authentication and transfer request and processes the authentication and transfer request at operation 525. During this operation, the second key server 224 verifies the user credentials and analyzes the environmental authentication data to ensure the mobile computing platform 208 remains within an authorized area and meets required environmental parameters.

Responsive to a successful authentication, at operation 530, the second key server 224 sends a transfer request to the first key server 220. This request initiates the process of transferring the authorization for the secure key from the first key server 220 to the second key server 224. At operation 535, the first key server 220 responds to the transfer request and sends a transfer response to the second key server 224. This transfer response includes the necessary information for the second key server 224 to assume responsibility for maintaining the secure cryptographic heartbeat with the mobile computing platform 208.

At operation 540, the second key server 224 sends a transfer authorization destined for the mobile computing platform 208 to the second WAP 216, confirming that the second key server 224 is responsible for managing the secure key and maintaining communication with the mobile computing platform 208. At operation 545, the mobile computing platform 208 receives the transfer authorization.

Responsive to the successful transfer of authorization, the secure cryptographic heartbeat process resumes with the new key server, namely the second key server 224. At operation 550, the mobile computing platform 208 sends a heartbeat message to the second key server 224 through the second WAP 216. At operation 555, the second key server 224 receives the heartbeat message.

At operation 560, the second key server 224 responds to the heartbeat message sending a heartbeat response to the mobile computing platform 208 through the second WAP 216. This response confirms the continued authorization of the mobile computing platform 208 under the management of the second key server 224. At operation 565, the mobile computing platform 208 receives the heartbeat response, such that the secure cryptographic heartbeat process continues. Thus, at operation 570, the mobile computing platform 208 continues uninterrupted access to the decrypted file. It is noted that the operations 510-565 must be executed within the timeout window. That is, if the operations 510-565 exceed the timeout window (e.g., no heartbeat message is received from either the first key server 220 or the second key server 224 before the timeout window is exceeded), a timeout would be detected, and operations of the method 400 described in FIG. 2B would be executed.

The method 500 demonstrates a capability of the ODKMS 200 to seamlessly transfer the management of secure keys and maintain continuous authorization when the mobile computing platform 208 moves between different network access points. This process ensures uninterrupted access to decrypted files for the end-user while maintaining the strict security measures implemented by the ODKMS 200.

Figure 2D:
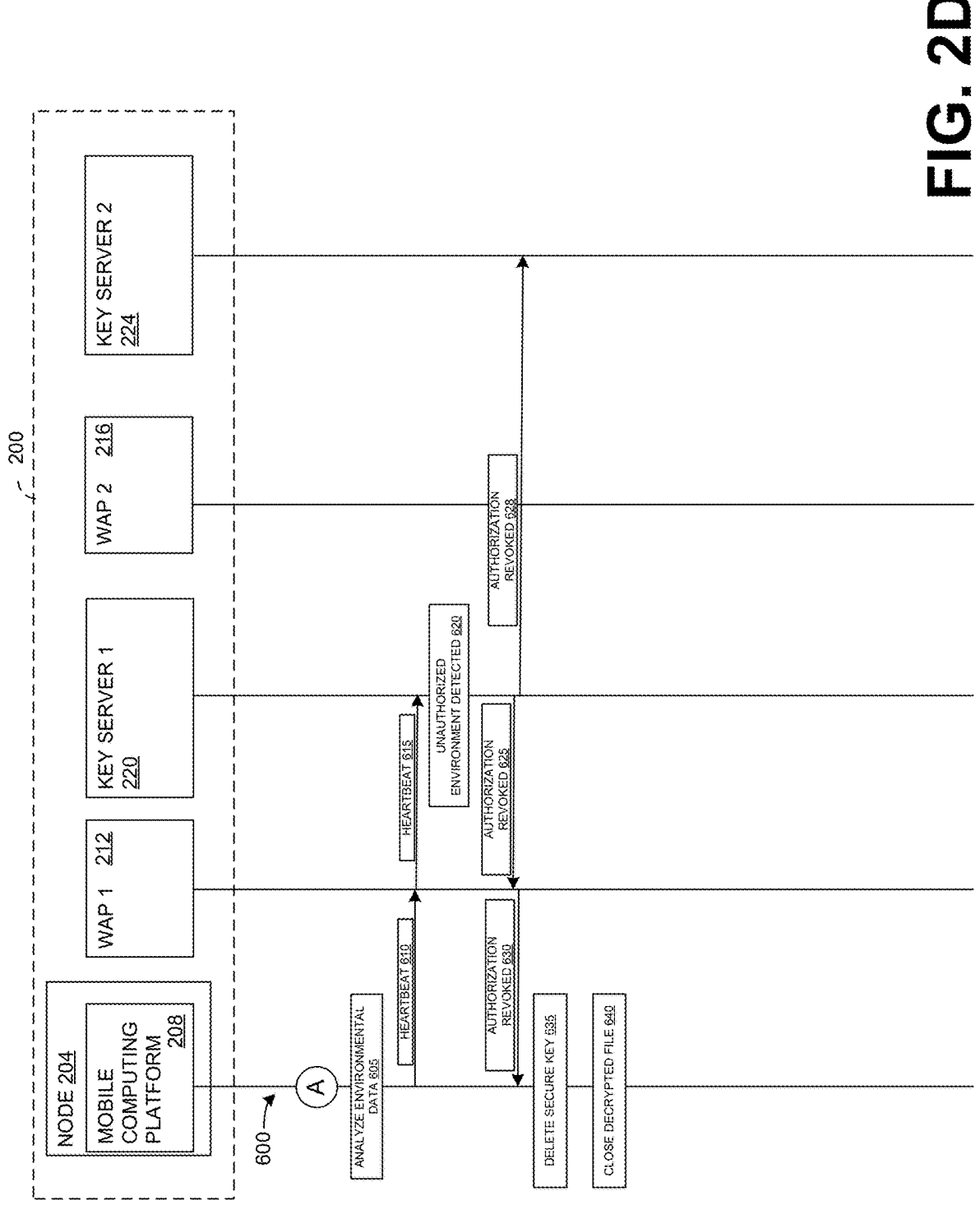
FIG. 2D illustrates a method of the ODKMS of FIG. 2A for revoking authorization to access a decrypted file.

FIG. 2D illustrates a method 600 for revoking authorization to access the decrypted file. The method 600 continues from Node A in FIG. 2A, where the heartbeat is established, and the mobile computing platform 208 is actively accessing the encrypted file.

At operation 605, the mobile computing platform 208 receives and analyzes environmental data collected from the environmental sensors on the node 204. The environmental data characterizes a current state of the environment of the node 204. If the environmental data indicates that the node 204 is in an authorized environment, at operation 610, the mobile computing platform 208 sends a heartbeat message to the first key server 220 through the first WAP 212. This heartbeat message includes environmental data collected from the environmental sensors on the node 204. At operation 615, the first key server 220 receives the heartbeat message. In response, the first key server 220 analyzes the environmental data included in the heartbeat message, and the first key server 220 detects that the node 204 is in an unauthorized environment.

In response to detecting the unauthorized environment, at operation 620, the first key server 220 immediately revokes the authorization for the mobile computing platform 208 to access the encrypted data. At operation 625, the first key server 220 sends an authorization revocation message to the mobile computing platform 208 through the first WAP 212. This authorization revocation message instructs the mobile computing platform 208 to terminate access to the decrypted file and remove the secret key. Additionally, at operation 628, the first key server 220 may also send an authorization revocation message to the second key server 224. This operation ensures that the mobile computing platform 208 cannot re-establish access through a different key server.

At operation 630, the mobile computing platform 208 receives the authorization revocation message. In an alternative situation, if the mobile computing platform 208 determines (e.g., at operation 605), that the node 204 is not in an authorized environment (e.g., the environmental data indicates the node 108 is outside acceptable limits). the mobile computing platform 208 generates the authorization revocation message and proceeds to operation 635. Thus, in response to receiving the authorization revocation message or generating the authorization revocation message, the mobile computing platform 208 initiates the secure deletion process at operation 635. During this operation, the security client on the mobile computing platform 208 deletes/removes the secret key from the volatile memory of the mobile computing platform 208. Additionally, at operation 640, the mobile computing platform 208 proceeds to close the decrypted file. This closure involves removing the decrypted data from the volatile memory of the mobile computing platform 208. In some examples, the mobile computing platform 208 overwrites the memory space previously occupied by the decrypted file and/or the secret key with random data to prevent any potential data recovery attempts.

The operations 635 and 640 are executed on the mobile computing platform 208, without requiring further communication with other nodes of the ODKMS 200, such as the first key server 220. This local execution ensures that the secure deletion process can be completed even if network connectivity is subsequently lost.

The method 600 demonstrates the ODKMS 200's ability to maintain security when the mobile computing platform 208 enters an unauthorized environment. By immediately revoking access and initiating the secure deletion process upon detection of an unauthorized environment, the ODKMS 200 prevents unauthorized access to sensitive data, maintaining the integrity and confidentiality of the information stored on the mobile computing platform 208.

Figure 3:
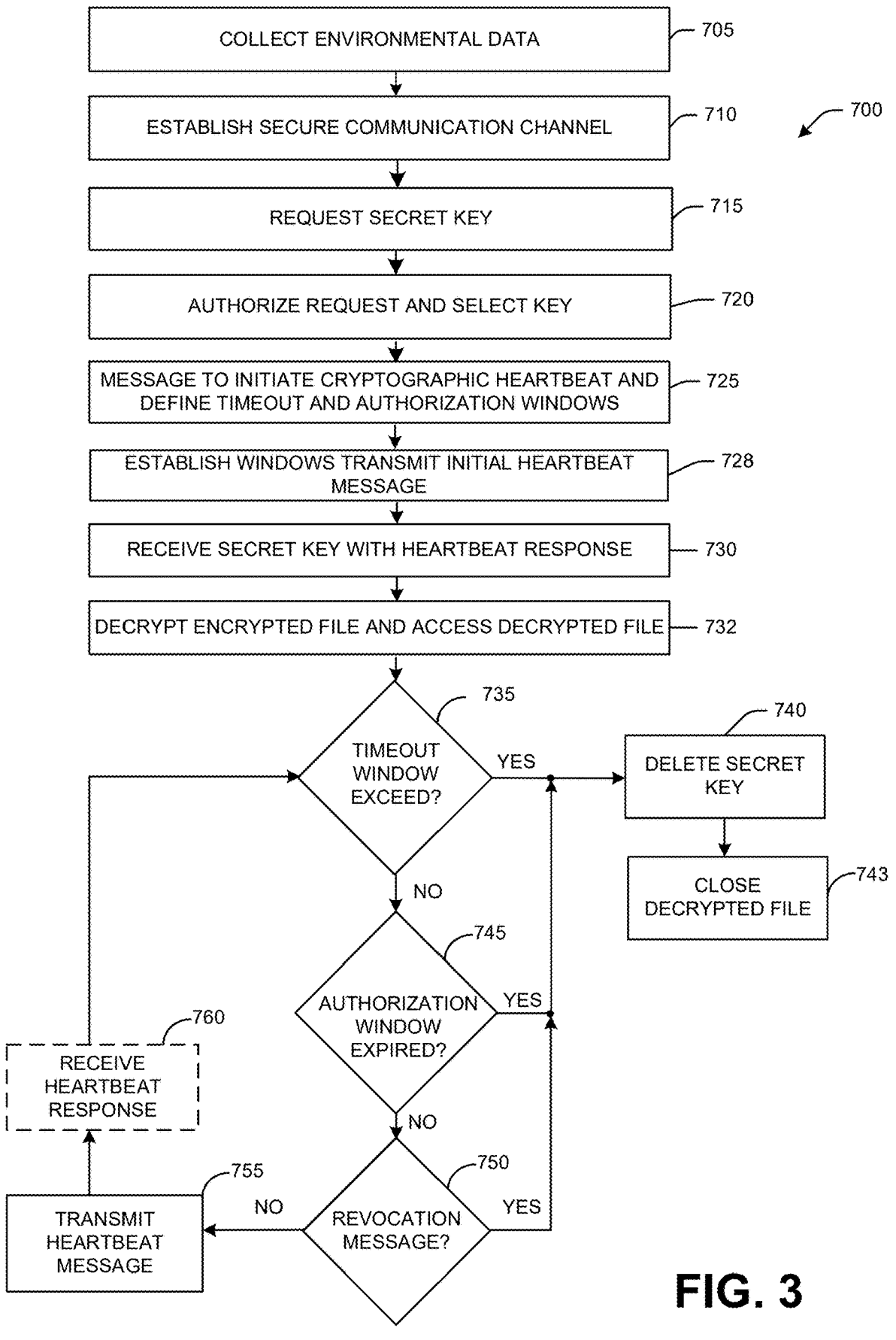
FIG. 3 illustrates an example of a method for securely controlling access to sensitive data in an encrypted file.

FIG. 3 illustrates an example of a method 400 for securely controlling access to sensitive data in an encrypted file stored in a volatile memory (a non-transitory medium). The method 700 could be implemented, for example by the ODKMS 100 of FIG. 1 and/or the ODKMS 200 of FIGS. 2A-2D. At block 705, a mobile computing platform (e.g., the mobile computing platform 104 of FIG. 1) collects environmental data from one or more environmental sensors (e.g., the K number of environmental sensors 112 of FIG. 1). At block 710, a secure communication channel (e.g., the secure communication channel 150 of FIG. 1) is established between the mobile computing platform and a key server (e.g., the key server 134 of FIG. 1). At block 715, the mobile computing platform transmits the collected environmental data along with a request for a secret key. In response, at block 720 the key server authorizes the request based on the environmental data and selects an appropriate key (e.g., one of the G number of keys 138 of FIG. 1) at block 720. At block 725, the key server sends a message to the mobile computing platform to initiate the cryptographic heartbeat process. This message defines parameters for both a timeout window and an authorization window. At block 728, the mobile computing platform establishes the timeout window and the authorization window and transmits an initial heartbeat message to the key server.

At block 730, the mobile computing platform receives the secret key along with the initial heartbeat response. The secret key is stored in volatile memory (e.g., the volatile memory 120 of FIG. 1). The heartbeat response causes the mobile computing platform to reset a timer (e.g., the timer 152 of FIG. 1) on the timeout window. At block 732, the mobile computing platform decrypts the encrypted file and holds the decrypted file (e.g., the decrypted file 158 of FIG. 1) in the volatile memory. Thus, the mobile computing platform has access to the data embedded in the encrypted file. The mobile computing platform is configured to prevent the decrypted file from being stores in non-volatile memory (e.g., the non-volatile memory 124 of FIG. 1) of the mobile computing platform. The mobile computing platform is configured to prevent the decrypted file or the secret key from ever being stored in the non-volatile memory 124. The method 700 enters a loop where the mobile computing platform continuously checks for various conditions.

Specifically, at block 735, the mobile computing platform makes a determination as to whether the timeout window has been exceeded. Stated differently, operations at the block 735 cause the mobile computing platform to monitor for a time a last heartbeat message (e.g., a heartbeat response) is received from the key server. If the determination at block 735 is positive (e.g., YES), the method 700 proceeds to block 740. If the determination at block 735 is negative (e.g., NO), the method 700 proceeds to block 745. At block 740, the mobile computing platform deletes/removes the secret key from the volatile memory. At block 743, the decrypted file is closed. In this manner, further access to the data embedded in the encrypted file is denied.

At block 745, the mobile computing platform determines whether the authorization window has expired. Stated differently, operations at the block 745 cause the mobile computing platform to monitor a total time that the mobile computing platform has authorization to access data in the encrypted file. This time is measured from the time that the mobile computing platform receives the initial heartbeat message, and a current/present time. If the determination at block 745 is positive (e.g., YES) such that the authorization window has expired, the method 700 proceeds to block 740. If the determination at block 745 is negative (e.g., NO) such that the authorization window has not expired, the method 700 proceeds to block 750.

At block 750, the mobile computing platform makes a determination as to whether an authorization revocation message has been received from the key server or generated by the mobile computing platform. Stated differently, the operations at the block 750 cause the mobile computing platform to monitor for receipt or generation of the authorization revocation message. The authorization revocation message could be provided from the key server, for example if a heartbeat message provided from the mobile computing platform has environmental data indicating that a node that includes the mobile computing platform is no longer in an authorized environment. Alternatively, the mobile computing platform can generate the authorization revocation message locally if the environmental data indicates that the mobile computing platform is not in the authorized environment (e.g., the environmental data indicates the mobile computing platform is outside acceptable limits). If the determination at block 750 is positive (e.g., YES), the method 700 proceeds to block 740. If the determination at block 750 is negative (e.g., NO), the method 700 proceeds to block 755.

At block 755, the mobile computing platform collects updated environmental data from the environmental sensors and transmits this data in a heartbeat message to the key server. At block 760, the mobile computing device receives a heartbeat response message transmitted from the key server, and the mobile computing platform resets the timeout window. The block 760 is shown as a dashed line, because in some situations, the heartbeat response may not be received by the mobile computing platform, such that they timeout window may be exceeded. This could happen, for example, if the mobile computing platform is unable to communicate with the key server. Operations in the loop are repeatedly executed, ensuring that the mobile computing platform maintains a secure connection with the key server and retains access to the decrypted file only as long as the mobile computing platform remains within the authorized parameters, as determined by the continuously updated environmental data.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A system for controlling access to data, the system comprising:
   a node comprising:
   an environmental sensor that measures a feature of an environment of the node;
   a non-transitory non-volatile memory having machine-readable instructions and an encrypted file that is only decryptable with a secret key;

a non-transitory volatile memory having machine-readable instructions; and
a processor for accessing the machine-readable instructions in the non-transitory non-volatile memory and the non-transitory volatile memory, the machine-readable instructions comprising:
   operations for a security client executable by the processor, the operations for the security client comprising:
      transmitting a request for the secret key to a key server, wherein the request includes environmental data from the environmental sensor characterizing a current state of the environment of the node;
      establishing a cryptographic heartbeat with the key server;
      receiving the secret key from the key server and store the secret key in the non-transitory volatile memory;
      decrypting the encrypted file using the secret key to create a decrypted file in the non-transitory volatile memory;
      monitoring a time since a last authenticated heartbeat message was received from the key server; and
      deleting the secret key from the non-transitory volatile memory and closing the decrypted file in response to one or more selected from the group consisting of (i) the time exceeding a predetermined timeout window, (ii) receiving a message from the key server indicating that authorization to the decrypted file is revoked, and (iii) determining that the node is not in an authorized environment based on the environmental data, wherein the security client prevents the secret key and the decrypted file from being stored in the non-transitory non-volatile memory.

2. The system of claim 1, wherein the environmental sensor comprises a Global Navigation Satellite System (GNSS) sensor, and wherein the environmental data comprises location information.

3. The system of claim 1, wherein the operations of the security client further comprise:
   receiving a cryptographic heartbeat message from the key server; and
   resetting the time since the last authenticated heartbeat message was received in response to receiving the cryptographic heartbeat message.

4. The system of claim 1, wherein the machine-readable instructions further comprise a data consuming module for accessing and processing the decrypted file while the secret key is available in the non-transitory volatile memory.

5. The system of claim 1, wherein the operations of the security client further comprise:
   setting an authorization window based on instructions received from the key server; and
   removing the secret key from the non-transitory volatile memory and closing the decrypted file in response to an expiration of the authorization window.

6. The system of claim 1, wherein the node communicates with a first wireless access point over a first a secure communication channel, and the key server is a first key server, and the operations of the security client further comprise:
   detecting a second wireless access point;
   establishing a second secure communication channel with a second key server via the second wireless access point in response to the detecting;

receiving a transfer authorization from the second key server; and continuing the cryptographic heartbeat with the second key server, wherein the continuing comprises receiving a next cryptographic heartbeat message from the second key server.

7. The system of claim 1, wherein the operations of the security client further comprise:

re-encrypting the decrypted file with modifications to the decrypted file using the secret key to provide a re-encrypted file in the non-transitory volatile memory; and storing the re-encrypted file in the non-transitory non-volatile memory.

8. The system of claim 1, wherein the key server comprises a non-transitory memory and a processor to execute operations, the operations of the key server comprising:

authenticating the security client based on user credentials and environmental data received from the security client;

selecting the secret key based on an authorization level determined from the user credentials; and initiating a cryptographic heartbeat with the security client.

9. The system of claim 1, wherein the operations of the security client further comprise overwriting a memory space in the non-transitory volatile memory occupied by the decrypted file with random data in response to closing the decrypted file.

10. A non-transitory machine-readable medium storing instructions that, when executed by a processor of a mobile computing platform, cause the processor to execute operations for a security client, the operations comprising:

collecting environmental data from an environmental sensor of the mobile computing platform;

transmitting the environmental data to a key server for authentication;

receiving a secret key from the key server;

decrypting an encrypted file stored in a non-transitory non-volatile memory of the mobile computing platform using the secret key to create a decrypted file in a non-transitory volatile memory of the mobile computing platform;

monitoring a time since a last authenticated heartbeat message was received from the key server;

monitoring for receipt of an authorization revocation message from the key server or generation of the authorization revocation message based on the environmental data; and in response to the time exceeding a predetermined timeout window or receiving or generating the authorization revocation message, removing the secret key from the non-transitory volatile memory and closing the decrypted file.

11. The non-transitory machine-readable medium of claim 10, wherein the environmental sensor comprises a Global Navigation Satellite System (GNSS) sensor, and wherein the environmental data comprises location information.

12. The non-transitory machine-readable medium of claim 10, wherein the operations further comprise:

receiving a cryptographic heartbeat message from the key server to establish a cryptographic heartbeat; and resetting the time since the last authenticated heartbeat message was received in response to receiving the cryptographic heartbeat message.

13. The non-transitory machine-readable medium of claim 12, wherein the mobile computing platform communicates with a first wireless access point over a first secure communication channel, and the key server is a first key server, and the operations of the security client further comprise:

detecting a second wireless access point;

establishing a second secure communication channel with a second key server via the second wireless access point;

receiving a transfer authorization from the second key server; and continuing the cryptographic heartbeat with the second key server, wherein the continuing comprises receiving a next cryptographic heartbeat message from the second key server.

14. The non-transitory machine-readable medium of claim 10, wherein the operations further comprise accessing and processing the decrypted file while the secret key is available in the non-transitory volatile memory.

15. The non-transitory machine-readable medium of claim 10, wherein the operations further comprise:

setting an authorization window based on instructions received from the key server; and removing the secret key from the non-transitory volatile memory and closing the decrypted file in response to expiration of the authorization window.

16. The non-transitory machine-readable medium of claim 10, wherein the operations further comprise:

re-encrypting the decrypted file with modifications to the decrypted file using the secret key to provide a re-encrypted file in the non-transitory volatile memory; and storing the re-encrypted file in the non-transitory non-volatile memory.

17. The non-transitory machine-readable medium of claim 10, wherein the operations further comprise:

setting an authorization window based on instructions received from the key server; and removing the secret key from the non-transitory volatile memory and closing the decrypted file in response to expiration of the authorization window.

18. A method for secure data management, the method comprising:

collecting, by a mobile computing platform, environmental data from an environmental sensor associated with the mobile computing platform;

transmitting, by the mobile computing platform, the environmental data to a key server for authentication;

receiving, by the mobile computing platform, a secret key from the key server;

decrypting, by the mobile computing platform, an encrypted file stored in a non-transitory non-volatile memory of the mobile computing platform using the secret key to create a decrypted file in a non-transitory volatile memory of the mobile computing platform;

monitoring, by the mobile computing platform, a time since a last authenticated heartbeat message was received from the key server;

periodically collecting and transmitting, by the mobile computing platform, updated environmental data to the key server for continued authentication; and in response to the time exceeding a predetermined timeout window, receiving an authorization revocation message from the key server based on the updated environmental data or generating the authorization revocation message based on the updated environmental data indicating that the mobile computing platform is not in an authorized environment, removing, by the mobile computing platform, the secret key from the non-transitory volatile memory and closing the decrypted file;

wherein the mobile computing platform prevents the secret key and the decrypted file from being stored in the non-transitory non-volatile memory of the mobile computing platform.

19. The method of claim 18, further comprising:

receiving, by the mobile computing platform, a cryptographic heartbeat message from the key server to establish a cryptographic heartbeat;

resetting, by the mobile computing platform, the time since the last authenticated heartbeat message was received in response to receiving the cryptographic heartbeat message; and accessing and processing, by the mobile computing platform, the decrypted file while the secret key is available in the non-transitory volatile memory and the time since the last authenticated heartbeat message has not exceeded the predetermined timeout window.

20. The method of claim 18, wherein the mobile computing platform communicates with a first wireless access point through a first secure communication channel, and the key server is a first key server, and the method further comprises:

detecting, by the mobile computing platform, a second wireless access point;

establishing, by the mobile computing platform, a second secure communication channel with a second key server via the second wireless access point;

receiving, by the mobile computing platform, a transfer authorization from the second key server; and continuing a cryptographic heartbeat with the second key server, wherein the continuing comprises receiving a next cryptographic heartbeat message from the second key server.

* * * * *